(12) United States Patent
Venegas, Jr.

(10) Patent No.: US 8,587,419 B2
(45) Date of Patent: Nov. 19, 2013

(54) COLLISION AVOIDANCE DETECTION ARRANGEMENT

(76) Inventor: Jose R. Venegas, Jr., Winnetka, CA (US)

( * ) Notice: Subject to any disclaimer, the term of this patent is extended or adjusted under 35 U.S.C. 154(b) by 142 days.

(21) Appl. No.: 13/373,132

(22) Filed: Nov. 7, 2011

(65) Prior Publication Data

US 2013/0113613 A1    May 9, 2013

(51) Int. Cl.
*B60Q 1/00* (2006.01)
(52) U.S. Cl.
USPC ........... 340/436; 340/435; 340/439; 340/903; 340/904; 340/905; 340/906; 340/907; 340/932.2

(58) Field of Classification Search
USPC ............... 340/436, 435, 439, 903–907, 932.2
See application file for complete search history.

(56) References Cited

U.S. PATENT DOCUMENTS

| D495,812 S | 9/2004 | Hilborn | D26/28 |
| 6,873,250 B2 * | 3/2005 | Viana et al. | 340/435 |
| 6,879,248 B2 * | 4/2005 | Flick | 340/435 |
| D518,842 S | 4/2006 | Hilborn | D16/208 |

* cited by examiner

*Primary Examiner* — Tai T Nguyen
(74) *Attorney, Agent, or Firm* — Don Finkelstein

(57) ABSTRACT

A detector arrangement for detecting the presence of objects to the rear or the front of a vehicle.

16 Claims, 3 Drawing Sheets

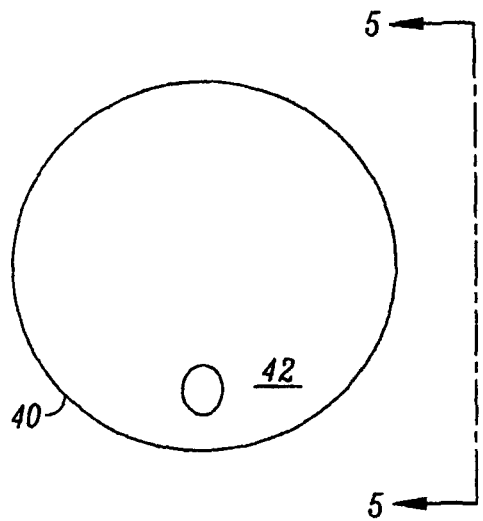 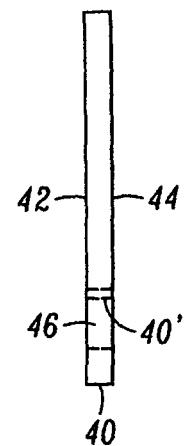
FIG. 4   FIG. 5
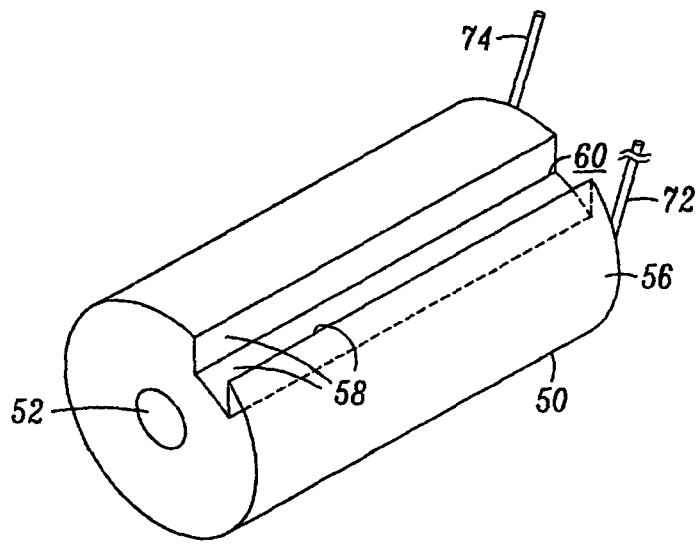
FIG. 6
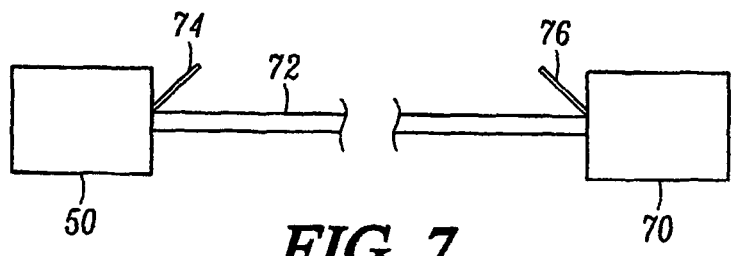
FIG. 7

COLLISION AVOIDANCE DETECTION ARRANGEMENT

BACKGROUND OF THE INVENTION

1. Field of the Invention

This invention relates to the detection art and more particularly to detector arrangements for the detection of objects and structures in proximity to a vehicle and generating a perceptible signal in response to the presence of such objects.

2. Description of the Prior Art

In recent years there has been the development of a variety of signal generating detectors such as miniature and subminiature cameras and video cameras, the development of comparatively small and inexpensive electromagnetic wave sensing detectors such as radar type detectors and the development of inexpensive sound wave detectors such as active sonar detectors. For utilization with these signal generating detectors, there has also been the development of high speed electronics for use with a display device wherein the display device provides a real time perceptible signal in response to the signal generated by such signal generating detectors. The combination of these signal generating detectors, the high speed electronics and the display has provided practical and comparatively inexpensive systems for use in various collision avoidance systems in vehicles.

One type of collision avoidance arrangements for vehicles which is in use is in the detection of structures or objects that are to the rear or in some applications to the front of the vehicle and thus may be obscured from the direct view of the operator of the vehicle. Such collision avoidance arrangements have often incorporated video cameras or other types of signal generating detectors to detect the presence of such structures or objects and the detectors generate a signal in response to the presence of such structures or objects, which signal is representative of the detected objects. The collision avoidance arrangement also include a display for receiving the signal generated by the signal generating detector and providing, at the display, a perceptible signal in response thereto for the operator of the vehicle so the operator of the vehicle may take the appropriate action to avoid collision with the unseen structure of object as so detected. As utilized herein, the word "perceptible" means a signal that may be perceived by humans such as a visual signal and/or an audible signal or the like.

The detectors heretofore proposed and/or utilized in such applications on vehicles for detecting structures, objects or other obstructions to the rear or as applicable to the front of a vehicle have been incorporated into housings that are often affixed to the vehicle so that the objects or obstructions within the field of view of the detectors may generate a signal representative of the area to the rear or front of the vehicle which is converted into a detectable signal provide the desired detectable signal for the vehicle operator.

It has been found that most vehicles have a generally vertically extending surface at the rear and also at the front of the vehicle and often the vehicle manufacturer places a medallion having the manufacturer's logo or symbol on such vertically extending surface. Since the surface on which the medallion is placed is generally vertical, a detector placed in such medallion may be oriented to have a field of view to provide a detected area in which the structure, object or other obstruction is most likely to be located. Therefore, such medallion provides a unique housing structure into which the signal generating detector may be placed and the signal generating detector may be oriented in the medallion so that the signal generating detector has a field of view that encompasses the area desired.

Accordingly, it is an object of the present invention to provide an improved signal generating detector arrangement for generating a signal representative of field of view of the signal generating detector.

It is another object of the present invention to provide an improved signal generating detector arrangement mountable on a vehicle for generating a signal representative of field of view of the signal generating detector to the rear or the front of the vehicle.

It is another object of the present invention to provide an improved signal generating detector arrangement mountable on a substantially vertically extending surface at the front or the rear of a vehicle for generating a signal representative of field of view of the signal generating detector to the front or rear of the vehicle.

It is yet another object of the present invention to provide an improved signal generating detector arrangement mountable in a medallion housing attached to a substantially vertically extending rear surface of a vehicle for generating a signal representative of field of view of the signal generating detector in an area in proximity to the vehicle.

SUMMARY OF THE INVENTION

The above and other objects of the present invention are achieved, in a preferred embodiment thereof by providing a medallion attachable to a preselected surface of the vehicle. The preselected surface of the vehicle is preferably a vertically extending rear surface of the For purposes of illustration herein the present invention is described as attached or affixed to a substantially vertically extending rear surface of a vehicle. However, the present invention is not to be considered as limited to generating a detectable signal for an area to the rear of a vehicle since the principals of the present invention may equally be utilized to detect such objects, structures or obstructions to the front of a vehicle.

The a medallion as so mounted provides a field of view to the rear or front of the vehicle. The medallion has a housing and the housing has an outer wall with both an outer surface and an inner surface. The inner surface of the outer wall of the housing has a plurality of spacer ribs extending inwardly a preselected distance from the inner surface of the outer wall. A first portion of the spacer ribs define a signal generating detector receiving cavity and there is also provided an alignment wall in said detector receiving cavity on the inner surface of the outer wall.

Passage walls are provided in the outer wall of the housing and the passage walls define an aperture extending through the outer wall and is in regions communicating with the signal generating detector receiving cavity. In the preferred embodiments of the present invention the detector receiving cavity is oriented in the medallion to be at a preselected angle with respect to the rear surface of the vehicle upon which the medallion is positioned. The preselected angle is in the range of 35 degrees to 45 degrees for the condition of the surface of the vehicle upon which the medallion is located being substantially vertical.

A first signal generating detector is mounted in the detector receiving cavity and the first signal generating detector has an alignment slot therein for receiving the alignment wall. The first signal generating detector is maintained in abutment with at least some of the first portion of the spacer ribs and with said alignment wall for secure positioning of the first signal generating detector in the detector receiving cavity at the preselected angle.

The first signal generating detector is preferably selected from the class consisting of cameras, video cameras, electromagnetic wave generating and receiving detectors such as radar or the like, active sound generating and echo receiving detectors such as active sonar or the like.

The spacer ribs may take the form of thin wall like members, cylindrical spacers, stand-offs of any geometrical design or any other type of spacer desired for particular applications. However, for convenience herein all such members are generically referred to as "ribs".

In preferred embodiments of the present invention, there may also be provided an inner wall spaced from the outer wall and the inner wall has an inner surface in opposed relationship to the inner surface of the outer wall. The inner surface of the inner wall may be attached to the ribs and/or attached to the periphery of the outer wall or otherwise secured thereto and provides a housing volume between the inner surface of the outer wall and the inner surface of the inner wall. The signal generating detector cavity is within the housing volume. The outer surface of the inner wall is secured to the preselected rear surface of the vehicle.

The exact location of the medallion on the preselected rear surface of the vehicle is selected to provide the desired field of view for the signal generating detector. The particular angle of the signal generating detector within the above described range can provide the necessary variations easily determined by those skilled in the art so that the desired field of view is achieved.

In other preferred embodiments of the present invention, a second signal generating detector may be included in the medallion. The second signal generating detector may also be selected from the class consisting of cameras, video cameras, electromagnetic wave generating and receiving detectors such as radar or the like, active sound generating and echo receiving detectors such as active sonar or the like. The second signal generating detector may be the same as the first signal generating detector or may be a different signal generating detector. For example, if the first signal generating detector is a video camera, the second signal generating detector may be a radar type detector having a different field of view from the first signal generating detector. Alternatively, for example, both the first and the second signal generating detectors may be the same, such as video cameras with different fields of view so that the operator of the vehicle may see the area immediately behind the vehicle as well as the are further removed from the rear of the vehicle. The second signal generating detector may be positioned in the same signal generating detector receiving cavity as the first signal generating detector or it may be in a separate signal generating detector receiving cavity which is formed substantially the same as the first signal generating detector receiving cavity.

In another preferred embodiment of the present invention the housing volume between the inner faces of the inner and outer walls may be solid except for the signal generating detector receiving cavity or cavities.

The signal generating detectors may be hard wired to the display in which embodiment the inner wall may be provided with an aperture to allow a conduit for transmitting the signal to the display to exit the medallion or, alternatively, one or more antennas may be incorporated in the signal generating detectors so that the signal from the signal generating detector or detectors may be wirelessly sent to the display.

BRIEF DESCRIPTION OF THE DRAWING

The above and other embodiments of the present invention my be more fully understood from the following detailed description taken together with the accompanying drawing wherein similar reference characters refer to similar elements throughout and in which:

FIG. 4 is a view illustrating the inner surface of the inner wall of the medallion of FIG. 1;

FIG. 5 is a view along the line 5-5 of FIG. 4 illustrating a side view of the inner wall of the medallion of FIG. 1;

FIG. 6 illustrates a perspective semi-schematic representation of a video camera useful in the practice of the present invention;

FIG. 7 is a schematic diagram of the structure of the present invention;

DESCRIPTION OF THE PREFERRED EMBODIMENTS

Figure 1:
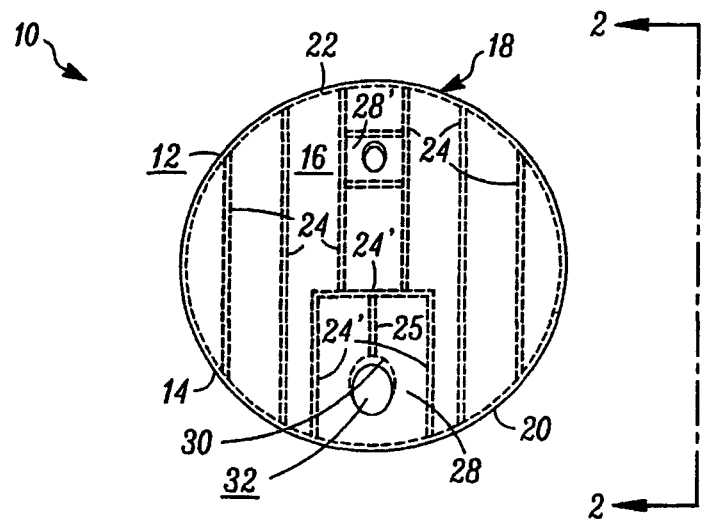
FIG. 1 is a front view of a medallion according to the principles of the present invention illustrating the outer surface of the outer wall of the medallion.
Figure 2:
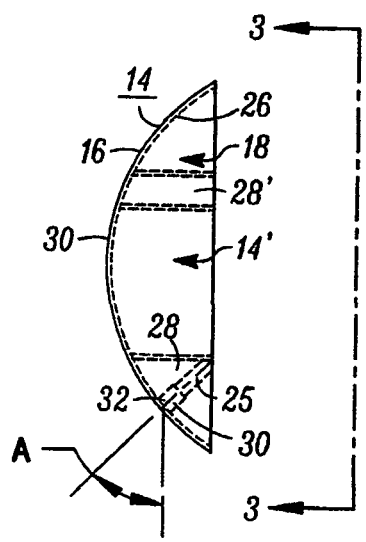
FIG. 2 is a view along line 2-2 of FIG. 1 illustrating a side view of the outer wall of the medallion shown in FIG. 1.
Figure 3:
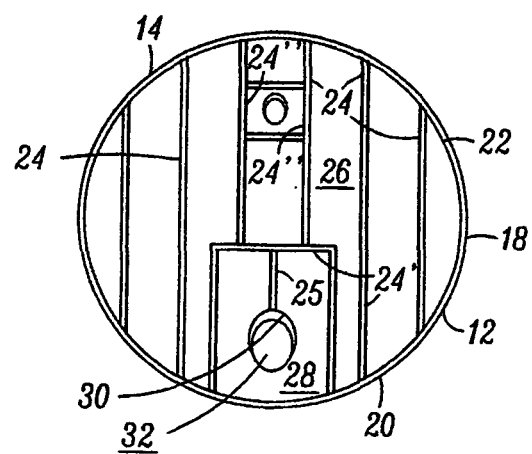
FIG. 3 is a view along the line 3-3 of FIG. 2 of the outer wall of the medallion shown in FIG. 1 illustrating the inner surface of the outer wall of the medallion of FIG. 1.

The above and other objects of the present invention are achieved in a first preferred embodiment 10 of the invention as illustrated in FIGS. 1, 2 and 3. As shown on FIG. 1 there is illustrated a medallion generally designated 12 having an outer wall 14 having an outer surface 16. The medallion 12 defines a housing generally indicated at 18 having a peripheral edge 20 of a rim 22. In the embodiment 10, the peripheral edge 20 is shown as circular. However, according to the principals of the present invention the peripheral edge and thus the medallion may have any geometric shape as desired for particular applications. The outer wall 14 of the medallion 12 may be a thin wall member formed into the form of the surface of a hollow spherical segment as indicated on FIGS. 1, 2 and 3 to define a housing volume 14' therein or may be formed into any other desired thin walled three dimensional geometric shape to define the housing volume 14' therein.

FIG. 3 illustrates the inner surface 26 of the housing 14. A plurality of ribs 24 extend away from the inner surface 26 of the outer wall 14 of housing 12. A first portion 24' of the ribs 24 define a first signal generating detector receiving cavity 28. Passage walls 30 in the outer wall 14 define an aperture 32 extending through the outer wall 14 providing communication with the first signal generating detector receiving cavity 28. An alignment wall 25 extends from the inner surface 26 of the outer wall 14 in the region of the first signal generating detector receiving cavity 28 for purposes as herein after described.

The first signal generating detector receiving cavity 28 is oriented in the outer wall to be aligned with respect to the vertical at an angle A as indicted on FIG. 3 and in preferred embodiments of the present invention the angle A is in the range of 35 degrees to 45 degrees for the condition of the rim 22 aligned in a vertical direction as set forth below.

In some applications of the present invention, a second signal generating detector receiving cavity 28' bounded by a second portion 24" of the ribs 24 may be provided.

As noted above, it has been found that many if not most of the present day vehicles have a rear surface that is generally oriented to be perpendicular to the level of the surface upon which the vehicle is positioned. As such, and in accordance with the principles of the present invention, the medallion 12 is attached to such a generally vertically extending rear surface of a vehicle which may be designated as the preselected surface upon which the medallion is attached.

In some applications of the present invention shown in FIGS. 1, 2 and 3, the rim 20 may be attached to the preselected rear surface of a vehicle. In such applications, the housing volume 14' is bounded by the inner surface 26 of the outer wall 14 and the surface of the vehicle to which the rim 22 is adhered.

In other applications of the present invention shown in FIGS. 1, 2 and 3 an inner wall 40 as shown on FIGS. 4 and 5 may be provided and attached to the rim 20 of the outer wall 14. The inner wall 40 may be a generally planar disc and has an inner surface 42 and an outer surface 44. The inner surface 42 of the inner wall 40 is in opposed relationship to the inner surface 26 of the outer wall 14 for the condition of the inner wall 40 attached to the outer wall 14. The inner surface 42 of the inner wall 40 may be attached to the rim 22 of the outer wall 14 or to one or more of the ribs 24, 24' and 24" or to both the rim 22 of the outer wall 14 and to one or more of the ribs 24, 24' and 24". In those embodiments of the present invention wherein the inner wall is utilized, the housing volume 14' is bonded by the inner surface 26 of the outer wall 14 and the opposed inner surface 42 of the inner wall 40.

The outer surface 16 of the outer wall 14 may be formed into or have applied thereto any desired configuration such as the logo of a car manufacturer, an arbitrary design or any other surface ornamentation. Similarly, the outer surface of the outer wall in any other of the embodiments of the present invention may be so configured.

A first signal generating detector may be mounted in the first signal generating detector receiving cavity 28. In the preferred embodiments of the present invention, the first signal generating detector may be selected from the class consisting of cameras, video cameras, radar and active sonar, or any other remote detecting device. As utilized herein, "radar" refers to any type of electromagnetic wavelength radiation, other than the visible wavelengths, signal generating and signal detecting devices.

In those embodiments wherein a video camera is utilized as the first signal generating detector, the video camera may be one of the micro video cameras 50 having a lens 52 as illustrated in FIG. 6 and the lens 52 of the first signal generating detector is oriented to be aligned with the aperture 32 in the outer wall 14 so as to have the desired field of view. The body 54 of the video camera may be provided with walls 58 defining a slot 60 therein. The slot 60 is sized to accommodate the alignment wall 25 in the first signal generating detector receiving cavity 28 as shown in FIGS. 1, 2 and 3. Further, the spacing of the first plurality of ribs 24' is selected so as to firmly engage the outer surface 56 of the first signal generating detector whereby the first signal generating detector is restrained in the first signal generating detector receiving cavity 28. The first signal generating detector 50 may be hard wired to a display 70 as shown FIG. 7. The first signal generating detector 50 as indicated on FIG. 7 may be considered for purposes of this invention as incorporating all of the electronics for detecting a particular area in the field of view of the signal generating detector 50 and generating a signal representative of the area so detected and converting the signal to a perceptible signal.

The signal generated by the first signal generating detector 50 and the associated electronics may be transmitted to the display 70 by "hard wire" as indicated at 72 or by wireless transmission from an antenna as indicated at 74 for reception by a corresponding antenna 76 at the display 70. For the embodiments of the present invention wherein the first signal generating detector provides a visual signal, the display 70 may be a conventional video type display screen. For other detectors, a compatible display may be utilized for generating the signal to be observed by the operator of the vehicle. Similarly, wherein the first signal generating detector is hard wired to the display 70, and the inner wall 40 (FIG. 5) is utilized, walls 40' defining an aperture 46 is provided extending through the inner wall 40 to allow the conduit 72 to extend from the medallion 12 to regions external thereof.

In some embodiments of the present invention, a second signal generating detector, which also may be selected from the class consisting of cameras, video cameras, radar and active sonar, or any other remote detecting device and may be the same or different from the first signal generating detector and mounted in the second signal generating detector receiving cavity 28' (FIG. 2) but preferably is oriented to provide a field of view different from the field of view of the first signal generating detector.

Figure 8:
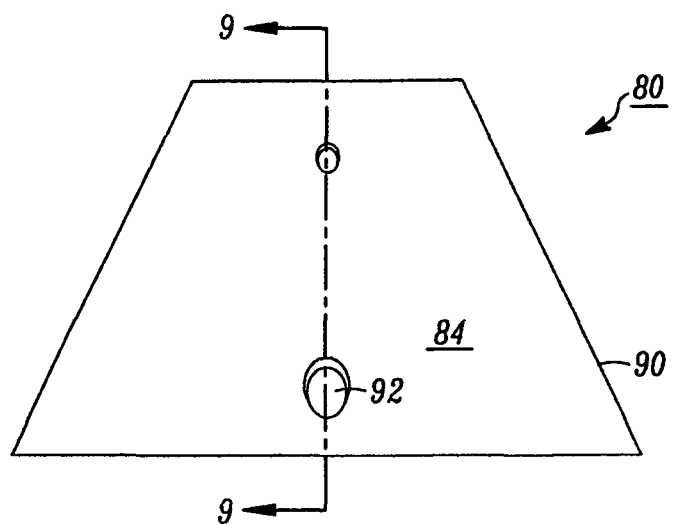
FIG. 8 is a front view of another embodiment of a medallion according to the principles of the present invention illustrating the outer surface of the outer wall; and, FIG. 9 is a sectional view along the line 9-9 of FIG. 8
Figure 9:
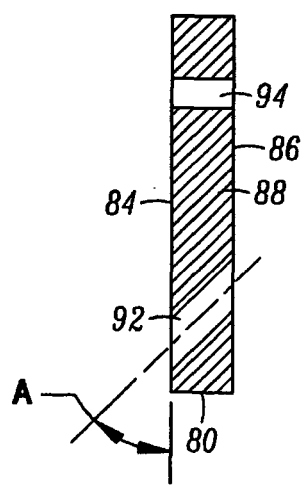

FIGS. 8 and 9 illustrate another embodiment, generally designated 80 of the present invention. In embodiment 80, there is provided a medallion 82 that is comparatively solid between an outer surface 84 and an inner surface 86 so that a housing volume 88 is solid between the outer surface 84 and the inner surface 86. The outer perimeter 90 of the embodiment 80 is shown as trapezoidal for illustrative purposes only. That is, the outer perimeter 90 may be any desired geometric configuration. In embodiment 80, the inner surface 86 may be affixed to the preselected rear wall of the vehicle. The medallion 82 has a first signal generating detector receiving cavity 92 which may be configured similarly to the first signal generating receiving cavity 28 of embodiment 10 and oriented at the angle A from the vertical. If desired, a second signal generating receiving cavity 94 configured similarly to the second signal generating receiving cavity 28' of embodiment 10 and oriented to a different field of view from the first signal generating receiving cavity 92. A first signal generating detector ands a second signal generating detector may be selected from the class consisting of cameras, video cameras, radar and active sonar, or any other remote detecting device as described above.

Although specific embodiments of the present invention have been described above with reference to the various Figures of the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The invention claimed is:

1. A vehicle rear view detector arrangement comprising, in combination:

a medallion mountable on a preselected surface of a vehicle, said medallion having a housing, said housing having an outer wall with an outer surface and an inner surface, and a plurality of ribs extending a preselected distance from said inner surface of said outer wall outer;

a first portion of said ribs defining a signal generating detector receiving cavity;

an alignment wall in said detector receiving cavity;

passage walls in said outer wall of said housing defining an aperture extending therethrough in regions communicating with said signal generating detector receiving cavity;

said detector receiving cavity oriented in said medallion to be at a preselected angle with respect to said preselected surface upon which said housing is mounted, and said preselected angle is in a range of 35 degrees to 45 degrees for a condition of the surface of the vehicle upon which the medallion is located is substantially vertical;

a first signal generating detector mountable in said detector receiving cavity and said signal generating detector having an alignment slot therein for receiving said alignment wall, whereby said first signal generating detector is maintained in abutment with at least some of said first portion of said ribs and with said alignment wall for secure positioning in said detector receiving cavity at said preselected angle.

2. The arrangement defined in claim 1 and further comprising:

an inner wall spaced from said inner surface of said outer wall, said inner wall having an inner surface in opposed relationship to said inner surface of said outer wall and an outer surface, said inner wall having second walls defining an aperture therethrough in communication with said detector receiving cavity, and said outer surface of said inner wall for attachment to the preselected vehicle surface.

3. The arrangement defined in claim 2 and further comprising:

a second signal generating detector mounted in said detector receiving cavity.

4. The arrangement defined in claim 3 wherein:

said second signal generating detector is different from said first signal generating detector and is selected from the class consisting of a camera, a video camera, a radar and an active sonar.

5. The arrangement defined in claim 1 wherein:

said first signal generating detector is selected from a class consisting of a camera, a video camera, a radar and an active sonar.

6. The arrangement defined in claim 5 and further comprising:

said first signal detector comprises a video camera for generating a first detector signal and said first detector signal is convertible into a visually perceptible signal;

first detector signal transmitting conduit having a first end connected to said video camera, and a second end;

a visual signal display member connected to said second end of said first detector signal transmitting conduit for displaying said visual signal.

7. The arrangement defined in claim 6 and further comprising:

second detector cavity walls in said housing volume defining a second detector receiving cavity having communication with regions external said medallion;

a second signal generating detector mountable in said second detector receiving cavity.

8. The arrangement defined in claim 7 wherein:

said second detector is a radar signal transmitting and radar signal receiving detector for generating and transmitting a radar signal to regions external said housing and receiving a reflected radar signal;

a second display member operatively connected to said second signal generating detector for providing a perceptible signal representative of said reflected radar signal.

9. The arrangement defined in claim 7 wherein:

said exterior surface of said housing comprises a logo.

10. The arrangement defined in claim 1 wherein:

said outer surface of said housing further defines a logo;

said first signal generating detector is selected from the class consisting of cameras, video cameras, radar and an active sonar.

11. A vehicle rear view detector arrangement comprising, in combination:

a medallion mountable on one of a rear surface and a front surface of a vehicle, said medallion having a housing, said housing having a exterior surface and an interior surface spaced from said exterior surface to define a housing volume therebetween;

first detector cavity walls in said housing volume defining a first detector receiving cavity having communication with regions external said medallion;

said first detector receiving cavity oriented in said medallion to be at a preselected angle with respect to the surface of the vehicle upon which said housing is mounted, the surface of the vehicle extending substantially vertically, and said preselected angle is in a range of 35 degrees to 45 degrees with respect to the vertically extending surface;

a first signal generating detector mountable in said first detector receiving cavity and said first signal generating selected from a class consisting of a camera, a video camera, a radar and an active sonar whereby said first signal generating detector is maintained in abutment with said first detector cavity walls for secure positioning in said first detector receiving cavity at a preselected angle.

12. The arrangement defined in claim 11 wherein:

said first signal generating detector selected from the class consisting of a camera, a video camera, a radar and an active sonar; and, said preselected angle is in the range of 35 degrees to 45 degrees from the vertical.

13. The arrangement defined in claim 12 and further comprising:

second detector cavity walls in said housing volume defining a second detector receiving cavity having communication with regions external said medallion;

a second signal generating detector mountable in said second detector receiving cavity.

14. The arrangement defined in claim 13 wherein:

said first detector is selected from the class consisting of a camera, a video camera, a radar and an active sonar;

said second signal generating detector is different from said first signal generating detector and is selected from the class consisting of a camera, a video camera, a radar and an active sonar.

15. The arrangement defined in claim 11 wherein:

said signal generating detector is mounted on a rear surface of the vehicle.

16. The arrangement defined in claim 11 wherein:

said signal generating detector is mounted on a front surface of the vehicle.

* * * * *